Figure 1A:
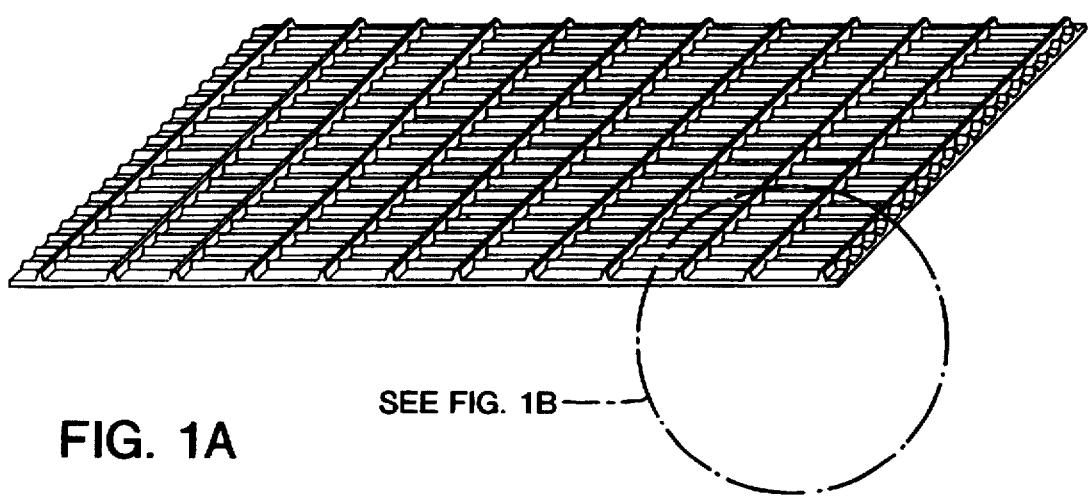

United States Patent [19]

Bohnstedt

[11] Patent Number: 5,776,630
[45] Date of Patent: Jul. 7, 1998

[54] SEPARATOR WITH LONGITUDINAL AND TRANSVERSE RIBS FOR USE IN ACCUMULATORS

[75] Inventor: Werner Bohnstedt, Henstedt-Ulzburg, Germany

[73] Assignee: Daramic, Inc., North Charleston, S.C.

[21] Appl. No.: 718,342

[22] PCT Filed: Apr. 20, 1995

[86] PCT No.: PCT/EP95/01464

§ 371 Date: Oct. 3, 1996

§ 102(e) Date: Oct. 3, 1996

[87] PCT Pub. No.: WO95/29508

PCT Pub. Date: Nov. 2, 1995

[30] Foreign Application Priority Data

Apr. 25, 1994 [DE] Germany .......................... 44 14 723.6

[51] Int. Cl.$^6$ .......................... H01M 2/18; H01M 2/16
[52] U.S. Cl. .......................... 429/143; 429/146; 429/147
[58] Field of Search .......................... 429/143, 146, 429/147

[56] References Cited

U.S. PATENT DOCUMENTS

| 662,277 | 11/1900 | Leitner | 429/143 |
|---|---|---|---|
| 1,331,018 | 2/1920 | Luthy | 429/143 |
| 4,618,545 | 10/1986 | Clegg et al. | 429/143 |
| 4,927,722 | 5/1990 | Bohnstedt et al. | 429/147 |

FOREIGN PATENT DOCUMENTS

| 0 541 124 | 5/1993 | European Pat. Off. . | |
|---|---|---|---|
| 541124A2 | 5/1993 | European Pat. Off. | H01M 2/18 |
| 298636 | 1/1952 | Switzerland . | |

OTHER PUBLICATIONS

Copy of the International Search Report dated Sep. 3, 1995.

Primary Examiner—Prince Willis, Jr.
Assistant Examiner—Carol Chaney
Attorney, Agent, or Firm—Nields, Lemack & Dingman

[57] ABSTRACT

Separators for use in accumulators are provided with integral longitudinal and transverse ribs. The separators have an increased transverse and longitudinal rigidity thus permitting a clear reduction in the sheet thickness. They are preferably provided in the form of rolls with the rib structure preventing a permanent distortion of the separators.

8 Claims, 1 Drawing Sheet

SEE FIG. 1B

SEPARATOR WITH LONGITUDINAL AND TRANSVERSE RIBS FOR USE IN ACCUMULATORS

The invention relates to separators for accumulators preferably in the form of material taken from the roll not cut to size. The separators are provided at least on one side with a pattern of longitudinal and transverse ribs which increases the rigidity of the separators both in the longitudinal and transverse directions and prevents a distortion of the separator sheet by coiling operations.

The separators which are used today in accumulators are formed from microporous sheets, which prevent short circuits between the plates and the falling out of plate material. However, by reason of their pore structure they permit an ionic flow of current in the electrolyte. Separators of this type are normally provided at least on one side with longitudinal ribs which should prevent the direct contact of the separator sheet with the positive electrode plate. At the same time these ribs give the separator a certain rigidity in the longitudinal direction. The separators consist generally of a thermoplastic material and are formed into pockets, into which the positive or negative electrode plate is inserted. The height of the ribs is usually greater than the thickness of the separator sheet which results in a relatively unfavourable torque for forces acting at the ribs which in conjunction with the plasticity of the plastics used frequently results in distortions of the separator. Distortions of this type occur particularly when the finished separator tracks are rolled up. As a result of this the separators are no longer even which causes serious problems during subsequent cutting to size and further processing into pockets. Their low rigidity in the transverse direction is also a disadvantage on the known separators.

Rigid separators for electrical accumulators are described in German patent specification DE-PS 28 47 453, for which a microporous base material is thermally bound to a network structure made of stretch plastic. The webs of the stretch plastic have different thicknesses and thus facilitate the escape of electrolytic gases. These separators have an increased bending strength in all surface directions. A disadvantage of these separators is that the network structure and the base material are manufactured independently of each other and then have to be joined together in an additional process step. In addition the network structure of the stretch plastic layer does not allow the electrolytic gases to rise in a straight line but forces the gas bubbles into a zig-zag shaped pattern. The battery separators disclosed in the German patent specification DE-PS 28 47 463 are rigid separators which are inserted in sheet form into the accumulator housing. The handling of rigid separators of this type is relatively difficult so that interest in them is decreasing. Furthermore the structure of the separators disclosed in DE-PS 28 47 463 does not allow them to be further processed to form pockets as is usual currently.

The object of the present invention is to provide separators for accumulators which have an increased rigidity both in the longitudinal and transverse directions and which are provided with ribs which can be manufactured integrally, i.e. at the same time as the porous separator sheet and which enable the charging gases to escape rapidly and in a straight line. The separators should preferably be provided in the form of rolls which are simple to handle and which can easily be further processed to form pockets.

The subject matter of the invention is a separator for accumulators which in addition to the longitudinal ribs which run in the direction of manufacture is provided with ribs which run transversally to it. The transverse ribs have a smaller height by comparison with the longitudinal ribs. The separators are disposed in the accumulator in such a way that the longitudinal ribs run vertically and the transverse ribs horizontally so that a channel is created by the reduced height of the transverse ribs which enables the charging gases to escape easily and in a straight line. The transverse ribs can be produced at the same time as the longitudinal ribs and do not require any additional working step.

In principle, all acid-resistant thermoplastic materials are suitable for the manufacture of the separators according to the invention. Preferred materials are polyvinyl chloride, polyethylene and polypropylene. polyethylene of high molecular weight is particularly preferred. The separators are preferably manufactured with the addition of inorganic fillers such as amorphous silicic acid with the composition and manufacture of separators of this type being known from the prior art (e.g. DE-PS 1 267 423, DE-PS 1 298 712, DE-AS 1 496 123 and DE-PS 39 28 468).

The thickness of the separator sheet is approximately 0.10 to 0.50 mm and the height of the longitudinal ribs between 0.3 and 2.0 mm so that the total thickness of the separator is up to approximately 2.50 mm. Separators with a total thickness of between 1.0 and 2.0 mm are preferred however. The transverse ribs have a lower height by comparison with the longitudinal ribs. Their height is approximately between $\frac{1}{10}$ and $\frac{1}{2}$ and preferably approximately $\frac{1}{3}$ of the height of the longitudinal ribs and is approximately between 0.1 and 0.7 mm. The longitudinal ribs are preferably approximately 0.7 mm in width and the transverse ribs approximately 0.35 mm in width.

The distance between two adjacent longitudinal or transverse ribs depends on the desired rigidity of the separator. With a sheet thickness of 0.25 mm, a longitudinal rib height of 1.0 mm and a transverse rib height of 0.4 mm distances of 8 mm to 15 mm for the longitudinal ribs and between 3 mm and 8 mm for the transverse ribs have proved satisfactory for use in starter batteries.

In a preferred embodiment longitudinal and transverse ribs form angles of 90° to each other. Embodiments with angles other than 90° are however conceivable. In this connection all transverse ribs can run parallel to each other so that all transverse ribs intersect the longitudinal ribs at the same angle. It is also possible, however, to have the transverse ribs form several groups of parallel ribs which groups amongst themselves are at angles of approximately 90° to ≦180° to each other as is known for example from the so-called herringbone pattern.

Separators with transverse ribs at right angles to the longitudinal ribs with a height of approximately $\frac{1}{3}$ of the height of the longitudinal ribs have a transverse rigidity which is approximately three times greater by comparison with separators without transverse ribs with it being possible to increase or reduce this value further by varying the transverse rib dimensions and spacings. The longitudinal rigidity of the separators according to the invention with a width of 100 mm normally reaches values of 5 mJ and the transverse rigidity values of 2.5 mJ.

The longitudinal and transverse ribs can have both a round and an angular cross section with equal-sided trapezoidal cross sections being preferred.

The separators according to the invention can be manufactured in the same way as conventional polyethylene separators. With this method the plastic material containing filler is extruded through a slot die and then run through two calender rolls by means of which both the longitudinal and the transverse ribs are produced and the separator sheet is reduced to the desired thickness.

Tests have shown that the separators according to the invention have a better machine workability than those without transverse ribs. A significantly better guidance of the separator tracks can be achieved as a result of the increased transverse rigidity and the processability for placing the electrode plates in pockets is considerably improved because of the increased transverse rigidity. In addition, production of separators with a considerably reduced sheet thickness and consequently with a reduced electrical resistance becomes possible which is of significance particularly in relation to efforts constantly to increase the output further with a constant battery volume. The separators according to the invention can be processed to form pockets without difficulty on conventional machines. The additional transverse ribs do not cause any problems either with the welding of the pockets by the use of heat or ultrasonic means or with the mechanical process for producing pockets.

The separators according to the invention are preferably provided in the form of material taken from the roll not cut to size. Tests have shown that neither during the coiling operation or upon storing of the rolls are distortions caused to the separators. Rolls with a diameter of approximately 0.8 m were examined and they had approximately 200 separator layers located one above the other.

Figure 1B:
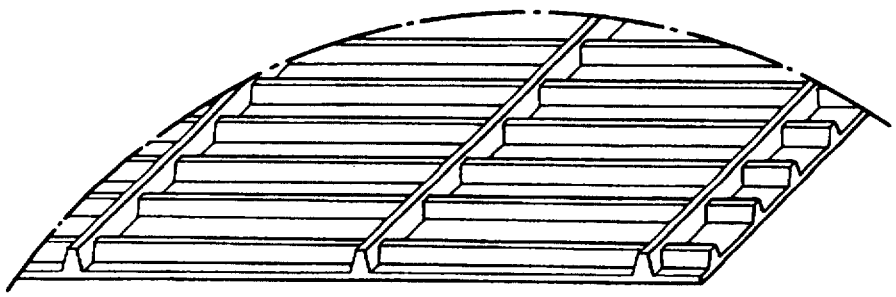

FIGS. 1A and 1B show perspective views of a separator according to the invention with transverse ribs running at right angles to the longitudinal ribs.

I claim:

1. Separator for accumulators made of a microporous, thermoplastic material which is provided with longitudinal and transverse ribs with the height of the longitudinal ribs being greater than that of the transverse ribs, and the longitudinal and transverse ribs consisting of solid ribs which are formed integrally from the plastic, characterized in that the transverse ribs extend across the entire width of the separator.

2. Separator according to claim 1, characterized in that the sheet thickness is approximately 0.10 to 0.50 mm.

3. Separator according to claim 1, characterized in that the height of the longitudinal ribs is 0.3 to 2.0 mm and the height of the transverse ribs is 0.1 to 0.7 mm.

4. Separator according to claim 1, characterized in that the longitudinal rigidity with 100 mm width is approximately 5 mJ and the transverse rigidity approximately 2.5 mJ.

5. Separator according to claim 1, characterized in that the total thickness of the separator is less than 2.5 mm.

6. Separator according to claim 1, characterized in that it consists of polyethylene, polypropylene, polyvinyl chloride or mixtures thereof.

7. Separator according to claim 1, characterized in that it is manufactured from polyethylene filled with silicic acid.

8. The separator of any one of claims 1 to 3 wherein said separator is housed on a roll.

* * * * *